United States Patent Office 3,403,196
Patented Sept. 24, 1968

3,403,196
COMPLEXING PROCESS
Robert B. Long, Atlantic Highlands, N.J., and Warren A. Knarr, Ponca City, Okla., assignors to Esso Research and Engineering Company, a corporation of Delaware
No Drawing. Filed June 23, 1965, Ser. No. 466,436
12 Claims. (Cl. 260—677)

ABSTRACT OF THE DISCLOSURE

The addition of extraneous materials, boiling above the feed, i.e., monoolefins, water, alcohols, paraffins, permits greater cuprous chloride absorption capacity for the vapor phase absorption of complexible ligands from feed mixtures; monoolefins accomplish similar results when added to liquid phase absorptions.

This invention relates to improved vapor phase processes for effecting complexing segregations employing solid cuprous chloride or bromide, preferably the new highly active large pore porosity cuprous chloride or bromide discovered by Dr. R. B. Long, fully described in U.S. patent application Ser. No. 333,926, filed Dec. 27, 1963. This application, including the processes described for using the new absorbent are hereby incorporated by reference in this application, the said processes being particularly benefited by the present invention. More particularly this invention relates to employing certain additives to increase the capacity of the absorbent and to improve the purity of the product (the material complexed) obtained upon dissociation of the absorbent. Most particularly this invention relates in preferred embodiments to employing as the additive (a) monoolefin solvents for the cuprous halide, preferably high solubility monoolefins, (b) polar materials such as water, alcohols, glycols, etc., or (c) inert materials such as paraffins. In a preferred embodiment these additives are of higher molecular weight than the feed and are employed under conditions to obtain trace condensation of the additive (preferentially to the feed) in the small pores upon the surfaces of the absorbent.

In U.S. Ser. No. 333,926 it was disclosed that considerable improvement in short residence time capacity of the high large pore porosity CuCl or CuBr could be obtained by operating the vapor phase process at temperatures within 20° C. of the dewpoint. It has now been discovered that in processes using these active absorbents and to a lesser extent in processes using any CuCl or CuBr, capacities can be increased (at a similar distance from the dewpoint) by adding to the feed an active material comprising either (a) a monoolefin solvent for the cuprous halide, or (b) a polar material such as water, alcohol, glycols, etc. It is noted that these additives may be higher boiling, of the same boiling range of the feed, or lower boiling. With respect to the latter they may be employed as the carrier gas where such is necessary to maintain vapor phase operations with a high boiling feed. In such an application where large amounts of carrier gas are used it has now been discovered that sufficient active additive is absorbed in the liquid high boiling feed material condensed on the surface and pores of the absorbent for the desired increase in capacity to be realized. Without intending to limit this invention it is believed that the mechanism for this improvement in capacity is that trace condensation of the active material on the absorbent in some way affects the crystal latice permitting smooth progression of the complexed phase inwardly into the particle. It is noted that use of the new high large pore porosity CuCl or CuBr is preferred to obtain really good capacity probably because the additive prepares only the surface and does not penetrate efficiently below the surface (the additive does not enter the complexed phase so as to move with it). With the high large pore porosity material the additive enters the pores and trace condensation occurs on the thin membrane surfaces between pores. These membranes are so thin, e.g., 2000 A. that surface activation by the additive is sufficient for the complexed phase to proceed rapidly through the membrane and thus produce high capacity for the total particle.

It has now additionally been discovered that by utilizing an additive material higher boiling than the feed, preferential condensation of this material on the absorbent occurs. This reduces the amount of additive required to be added. Additionally, it has been discovered that by choosing an additive higher boiling than the feed that this material tends to remain on the absorbent and thus only small amounts need be added with the feed. It can be sufficiently high boiling so as not to be removed even in decomplexing or less high boiling with the additive being re-added to the absorbent after decomplexing.

It has now also been discovered that by utilizing an additive higher boiling or of the same boiling range as the feed that the concentration of both the desired material to be absorbed and the impurities is reduced thus increasing the purity of the final product as follows: (a) where the impurity complexes with the absorbent, reduced partial pressure of the impurity causes smaller amounts of the impurity to complex and (b) regardless of whether the impurity does or does not complex the concentration if impurity in the mixture physically adsorbed on the surface and in the pores of the CuCl or CuBr is reduced thereby reducing contamination due to residual amounts of this mixture being present (after stripping) during desorption.

In another preferred embodiment it has now been discovered that by adding an inert activator higher boiling than the feed a substantial improvement in capacity can be obtained. This is surprising in that addition of e.g., a higher boiling paraffin causes the concentration (percent) of this material in the trace condensate on the absorbent to be very high and the concentration (percent) of the ligand to be very low. However, despite the low concentration of ligand to be absorbed a surprisingly high capacity is obtained. Although again it is not intended to limit this invention but as an aid to understanding it is theorized that the improvement in capacity is caused not by any physical effect on the crystal latice surfaces but by the fact that the concentration of total molecules per area of surface for a liquid is 100–1000 times that for the gas and thus despite the lower (percent) ligand concentration in the liquid the total number of molecules per area of surface is increased and higher capacities are thereby obtained. This applies also to operations away from the dewpoint of the feed gas. Thus at 40° C. from the dewpoint of butadiene, butadiene concentration in liquid isooctane is 25 mol. percent.

It has additionally been discovered that highest short residence time capacities are obtained by using as the additive a material more weakly complexing than the material being separated (complexed) or a material that does not complex with the cuprous halide. Thus, with, e.g., butadiene, monoolefins are preferably utilized and with, e.g., ethylene (a weakly complexing material) it is preferred to use a polar noncomplexing material or somewhat less preferably an inert internal, e.g., a paraffin rather than a monoolefin solvent. It is also noted that where monoolefin solvents or polar materials are used as additives it is preferred to substantially completely remove these materials prior to desorption by, e.g., prolonged stripping or addition of an ether or paraffin near its dewpoint at a cold temperature (to dissolve the polar material and aid stripping) followed by stripping. Such removal is desirable to prevent partial loss of pore volume which otherwise occurs. It is also noted that the discovery with respect to means for improving purity of the absorbed product (described above) applies also to the use of higher boiling inert materials such as paraffins used as additives.

It is noted that by adding to the feed either the above described active additives or an inert material such as a paraffin the dewpoint may be shifted to obtain more economic conditions for operating near the dewpoint, i.e., adding higher boiling materials permits operation at higher temperatures and lower pressures (e.g., for ethylene separations to decrease refrigeration required) use of lower boiling additives permits operation at higher pressures and lower temperatures (e.g., avoidance of vacuum conditions in separation of piperylenes). With respect to the higher boiling additives it is noted that the extent to which higher temperatures may be economically be used is limited by the fact that the pressure dissociating curves for most ligands show higher dissociation pressures at higher temperatures. Thus, since the partial pressure of the desired component complexed can only approach (must be above for complexing to take place) the dissociation pressure for that component, the tail gas concentration even considering use of high pressures will be uneconomically high (too much valuable product lost) if too high complexing temperatures are utilized.

Suitable "active" additives are $C_1$–$C_{10}$, preferably $C_1$–$C_3$, monoalcohols; $C_1$–$C_{10}$, preferably $C_2$–$C_6$ glycols; water and $C_4$–$C_8$ branched or straight chain olefins having appreciable solubility as pure materials for the cuprous salt. These active additives may also be used in the pure state or mixed with inert materials such as the "inert" additives. Particularly preferred monoolefins are butene-1, isobutylene, pentene-1 and hexene-1 because of their high solubility for CuCl and CuBr. Particularly preferred alcohols are methyl, ethyl and normal propyl alcohols. Particularly preferred glycols are ethylene and propylene glycols.

Suitable "inert" additives are any materials that do not appreciably complex with CuCl or CuBr. under the conditions of the separation process, alcohols, and materials which do not deleteriously affect the solid CuCl or CuBr, e.g., by dissolving or reacting with it. Preferred "inert" additives are $C_1$–$C_{30}$ paraffins, propylene and $C_4$–$C_{30}$ low solubility, i.e., internal monoolefins, e.g., butene-2, $C_2$–$C_{30}$ ethers and $C_6$–$C_{30}$ aromatics. More preferred "inert" additives are $C_1$–$C_{10}$ paraffins, $C_2$–$C_{10}$ low solubility monoolefins, $C_2$–$C_{10}$ ethers and $C_6$–$C_{10}$ aromatics. A particularly preferred monoolefin is propylene. Particularly preferred paraffins are methane, ethane, propane and n- and isobutane, pentanes, hexanes, isooctane, hexadecane, etc. Preferred ethers are methyl, ethyl and propyl ether, and $C_4$–$C_{10}$ symmetrical and unsymmetrical ethers, preferably symmetrical ethers. Particularly preferred aromatics are benzene, toluene, xylenes, ethyl benzene, cumene, etc.

It is noted that smears rather than individual compounds may be utilized and that these smears may also include mixtures of different classes such as paraffins and olefins.

The amount of additive used will vary widely. Thus, as previously mentioned where a high boiling material is utilized this may be merely added during the initial operation to coat the surface of the CuCl or CuBr after which it will be retained. Alternatively, material may be less high boiling and be re-added to the absorbent after desorption rather than to the feed. Similarly, at the other extreme where the additive is lower boiling than the feed the amount may be considerable to lower the boiling point so as to obtain vapor phase operations and to obtain sufficient quantities of the active additive dissolved in the material condensed on the surface to obtain the desired activation. Where the additive is added with the feed the amount will vary from 0.01 to 99 wt. percent based on feed. The additive is also preferably used in such quantities that the concentration of additive present in the liquid absorbed in trace amounts on the surface of the absorbent is preferably above 0.1%, more preferably above 5%. This amount may be as high as 99% and still be effective due to the high number of molecules of ligand present on the surface of the absorbent in a liquid vs. gas phase contacting. In general, where the additive is used continuously with the feed it is preferred to use 0.1 to 10 vol. percent preferably 0.5 to 2 vol. percent additive based on the raw feed supplied to the process. Where it is desired to increase the purity of the product recovered, i.e., to decrease concentration of contaminants from the feed in the product, it is preferred to use concentrations of additives of 0.1 to 20 vol. percent, preferably 0.5 to 5 vol. percent based on raw feed.

The preferred CuCl or CuBr to be used with the present invention is the high large pore, porosity material discovered by Dr. R. B. Long, previously referred to. This material has the following characteristics:

(1) Porosity—Above 10%, more preferably above 15%, yet more preferably above 25%, most preferably above 35% of total volume of the particle pores of 550–10,000 A. diameter, preferably preponderantly above 1,000 A. diameter. Also, preferably particles have 0.1 to 15%, more preferably 0.3 to 5%, most preferably 0.5 to 3% of total volume of pores 1–550 A., preferably 70–550 A.
(2) Purity—Preferably above 90%, more preferably above 95%, yet more preferably above 99%, most preferably above 99.5% CuCl or CuBr.
(3) Size—Above about 50%, preferably above about 65%, more preferably above about 85% by weight of particles 10–600 microns, more preferably 20–320, most preferably 30–200, yet most preferably 50–100 microns (average diameter). These particles are regular, unitary (rigid, continuously joined structures, not small particles physically aggregate by surface effects only) particles.

The above described active CuCl or CuBr is prepared by slow precipitation (growth) of crystalline CuCl or CuBr diolefin, acetylene, nitrile, or carbon monoxide (or other ligand which forms a stable complex having a ratio of copper to ligand of above 1:1) complex particles from a liquid containing the complex in solution. For example, the material may be prepared by precipitating the complexes (a) by addition of water to a solution of CuCl or CuBr in concentrated acid, or (b) merely addition of the ligand to a monoolefin, e.g. butene-1 solution of CuCl or CuBr.

The present invention of the use of additives in vapor phase operations may be used in effecting more economic separations of any compounds capable of forming a complex with cuprous chloride or cuprous bromide. Thus, this includes all the separations described in the voluminous prior art previously referred to and additional compounds which it has been discovered complex with cuprous chloride and bromide. Preferred materials which complex with cuprous chloride or bromide are inorganic materials such as carbon monoxide and organic materials containing up to about 16 carbon atoms, preferably up to about 12 carbon atoms, more preferably up to about 8 carbon atoms. The higher boiling materials can be complexed in the vapor phase by techniques such as the use of vacuum, carrier gases, etc. Any materials may be used as carrier gases which do not interfere with the complexing reaction, e.g. inert gases, organic or inorganic materials. Examples of preferred materials which complex with cuprous chloride or bromide are $C_2$–$C_{16}$, preferably $C_2$–$C_{12}$, more preferably $C_2$–$C_8$, compounds having one or more of the following functional groups through which the complex is capable of being formed:

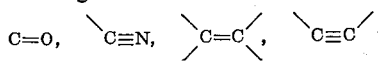

Carbon monoxide is suitable for use as the ligand. Additionally, unsaturated carbonyl compounds, such as propenal, butenal, pentenal, and the like; the various unsaturated ketones such as 1-butene-3-one, 1,4-pentadiene-3-one, 2-pentene-4-one, and similar ketones may be employed. In general, the alkane nitriles such as methane nitrile, ethane nitrile, propane nitrile, and higher nitriles are useful. Aryl, alkaryl and arylalkyl nitriles also complex with cuprous salt and may be used to form the liquid complex precursor. Unsaturated nitriles, such as acrylonitrile, methacrylonitrile, and ethacrylonitrile are further examples of ligands suitable for use in the present process. Ligands having a combination of functional groups selected from the list recited above are less preferred alternates. Also, other functional groups may be present so long as these do not interfere with complex formation.

Examples of olefins are ethylene, propylene, butylene, isobutylene, pentenes, etc.

While alpha, non-alpha, straight and branched chain olefins are all employable, alpha olefins appear to complex more readily, presumably due to the absence of steric hindrance and are preferred. Di- and triolefins such as propadiene, butadiene, isoprene, dicyclopentadiene, cyclopentadiene, octadiene, cyclododecatriene and the like, readily complex. Olefinic aromatic compounds such as styrene and the like may also be employed. The acetylenes such as methyl, ethyl, vinyl, propyl acetylenes and the like, as well as acetylene per se are also useful as ligands. It should be noted that compounds containing functional groups in addition to the functional group(s) through which the complex is formed may also be employed since they do not ordinarily interfere with complexing. Also, compounds containing more than one functional group through which the complex is capable of being formed may by proper choice of conditions (chosen based on the temperature pressure dissociation curve) be separated from another compound having one of the same functional groups, e.g. acrylonitrile from acetonitrile.

The present invention may be carried out by any of the known methods of contacting solids with gases. Thus, fixed bed processes, moving bed processes, fluidized bed processes, dispersed phase bed fluidized solids processes, etc., may be used. In these processes absorption and desorption may be carried out in blocked operation or may be carried out continuously with circulation of solids between two beds, one operated on absorption and one on desorption.

In the preferred embodiment of this invention, particularly where the new active high large pore porosity CuCl or CuBr is used, solid unsupported CuCl or CuBr is contacted with the vapors in a process in which the particles are continuously agitated, e.g., utilized as a fluid bed or otherwise suspended (dilute phase or dense phase fluid bed) in flowing vapors, utilized as a mechanically mixed bed, etc. while some means of cooling is used to remove the exothermic heat of reaction. Suitable examples of equipment to achieve mechanical mixing are, e.g., rotary cement kilns (the rotor itself may carry cooling coils), vibrating baffles, use of stirrers, etc. In all cases sufficient movement of the particles should be achieved to obtain efficient heat transfer between the cooling (or for desorption heating) means and the particles and to prevent caking of the particles occasioned by the presence of any liquids, e.g. condensation of feed.

The process may be either continuous with circulation of solids between two beds (one operated on absorption and the other on desorption) or cyclic, i.e., the same reactor operated first on absorption and then on desorption.

It is preferred to conduct complexing in the vapor phase at a temperature within 15° C., preferably within 10° C., more preferably within 5° C. of the dewpoint of the feed. It has now been found that at these conditions the additive is used to particular advantage. Thus, the trace condensation of the feed in admixture with the additive on the surfaces of the particles promotes smooth progression of the complexing material into the particle.

In another preferred embodiment it is preferred to add monoolefin solvent activators in the amounts described above also in liquid phase operations.

Preferred complexing and decomplexing conditions used for effecting preferred commercial separations using the above described system are as follows (preferred superficial velocity fluidization rates 0.05–5.0, preferably 0.15–1.0 ft./sec.):

|  | Preferred | Most preferred |
|---|---|---|
| Butadiene separated from butadiene mixtures with: | | |
| Complexing: | | |
| Temperature, ° C | −10–70 | 0–40 |
| Pressure, atmos | 0.5–10 | 1–5 |
| Gas residence time, seconds | 1–400 | 15–150 |
| Solids residence time, minutes | 10–200 | 20–100 |
| Decomplexing: | | |
| Temperature, ° C | 40–100 | 60–90 |
| Pressure, atmos | 0.5–10 | 1–5 |
| Gas residence time, seconds | 1–400 | 15–150 |
| Solids residence time, minutes | 5–200 | 10–100 |
| Ethylene separated from steam cracking $C_2$-stream: | | |
| Complexing: | | |
| Temperature, ° C | −50–40 | −30–20 |
| Pressure, atmos | 1–100 | 10–60 |
| Gas residence time, seconds | 1–400 | 15–150 |
| Solids residence time, minutes | 10–200 | 20–100 |
| Decomplexing: | | |
| Temperature, ° C | −5–100 | 35–75 |
| Pressure, atmos | 1–100 | 10–60 |
| Gas residence time, seconds | 1–400 | 15–150 |
| Solids residence time, minutes | 5–200 | 10–100 |
| Acrylonitrile separated from acetonitrile:[1] | | |
| Complexing: | | |
| Temperature, ° C | −10–80 | 0–50 |
| Pressure, atmos | 0.5–10 | 1–5 |
| Gas residence time, seconds | 1–400 | 15–150 |
| Solids residence time, minutes | 10–200 | 20–100 |
| Decomplexing: | | |
| Temperature, ° C | 50–140 | 70–120 |
| Pressure, atmos | 0.5–10 | 1–5 |
| Gas residence time, seconds | 1–400 | 15–150 |
| Solids residence time, minutes | 5–200 | 10–100 |
| Carbon monoxide separated from hydrogen: | | |
| Complexing: | | |
| Temperature, ° C | −25–100 | −10–60 |
| Pressure, atmos | 0.5–100 | 1–60 |
| Gas residence time, seconds | 1–400 | 15–150 |
| Solids residence time, minutes | 10–200 | 20–100 |
| Decomplexing | | |
| Temperature, ° C | 20–140 | 40–120 |
| Pressure, atmos | 0.5–100 | 1–60 |
| Gas residence time, seconds | 1–400 | 15–150 |
| Solids residence time, minutes | 5–200 | 10–100 |
| Allene separated from methyl acetylene: | | |
| Complexing: | | |
| Temperature, ° C | −40–70 | −20–40 |
| Pressure, atmos | 0.5–25 | 1–15 |
| Gas residence time, seconds | 1–400 | 15–150 |
| Solids residence time, minutes | 10–200 | 20–100 |
| Decomplexing: | | |
| Temperature, ° C | 30–115 | 40–100 |
| Pressure, atmos | 0.5–25 | 1–15 |
| Gas residence time, seconds | 1–400 | 15–150 |
| Solids residence time, minutes | 5–200 | 10–100 |
| Piperylenes separated from cyclopentene:[2] | | |
| Complexing: | | |
| Temperature, ° C | −10–80 | 0–70 |
| Pressure, atmos | 0.1–5 | 1–3 |
| Gas residence time, seconds | 1–400 | 15–150 |
| Solids residence time, minutes | 10–200 | 20–100 |
| Decomplexing: | | |
| Temperature, ° C | 40–125 | 60–110 |
| Pressure, atmos | 0.1–5 | 1–3 |
| Gas residence time, seconds | 1–400 | 15–150 |
| Solids residence time, minutes | 5–200 | 10–100 |

[1] For the nitrile separations an inert carrier gas, such as $N_2$, $CH_4$ etc, must be used to prevent condensation at the high pressures.
[2] To operate with piperylenes at low temperatures and the higher pressures a carrier gas such as nitrogen must be used.

As previously discussed, in each of the above separations it is preferred to utilize combinations of conditions within the ranges cited to be near the dewpoint.

A preferred process for carrying out the present invention comprises circulation of solids between two fluidized beds, one operated on absorption and one on desorption. Vaporous feed is supplied to a first vessel containing a bed of CuCl or CuBr supported on a distribution plate and fluidized by the feed vapors. Conditions are adapted to obtain absorption (complexing) in this first vessel. CuCl or CuBr particles are continuously withdrawn from the fluid bed and are passed to a stripper where they are heated and/or stripped of nonselectively absorbed feed. Stripping gas may be supplied or stripping may be effected primarily by heating. The stripping may be conducted under conditions such that no appreciable decomplexing occurs to obtain maximum recoveries or may be conducted to obtain partial decomplexing of, e.g., 1–10%, preferably 3–6% of the compound complexed containing the particles. Following stripping the particles are passed to the second vessel containing a bed of CuCl or CuBr supported on a distribution plate and fluidized by desorption vapors which preferably are the product gas desorbed. Conditions are adapted to obtain desorption (dissociation) in this second vessel, i.e., temperatures and pressures to be below the dissociation pressure for the particular temperature. Desorbed particles are withdrawn from the second vessel and are passed to the first vessel thus completing the cycle.

The present invention will be more clearly understood from a consideration of the following examples and the laboratory data contained therein.

Example 1.—Monoolefin CuCl solvent additive—ethylene

Sufficient active CuCl (prepared by precipitation of solid CuCl-butadiene complexed from a solution of CuCl dissolved in butene-1, followed by decomplexing) was supplied to a laboratory fluidized solids glass column to provide a 7¼ inch deep fluid bed. A 39.6% ethylene (remainder mainly ethane) feedstream was continuously supplied at atmospheric pressure and the temperature of the fluid bed was maintained at −83° F. (dewpoint −160° F.). A series of readings over a period of an hour were taken of the percent of the total ethylene in the feed complexed as follows: 5 minutes—62%, 8 minutes—42%, 10 minutes—24%, 20 minutes—6%, 30 minutes—1%, 33 minutes—0%. When 3.98 mol percent butene-1 based on feed was also supplied (approximately same conditions, i.e., atmospheric pressure and −87° F. fluid bed but dewpoint now −87° F. due to additive) the following readings were obtained: 5 minutes—56%, 10 minutes—54%, 15 minutes—54%, 20 minutes—54%, 30 minutes—50%, 35 minutes—43%, 40 minutes—30%, 45 minutes—12%, 50 minutes—0%. In each case after the feed was discontinued measurements were made of the amount of ethylene released from the CuCl ethylene complexed particles as follows: no butene-1—particles complexed to only 20.6% of capacity; 3.98 mol percent butene-1 added—particles complexed to 54.6% of capacity. This example shows the highly beneficial effect of butene-1 on capacity (large amounts of solids and heating and cooling of uncomplexed CuCl would otherwise be required).

Example 2.—Monoolefin CuCl solvent additive—$C_5^=$

Active CuCl (prepared by precipitation of solid CuCl-butadiene complexed by slow addition of water to a solution of CuCl dissolved in concentrated HCl) was charged to a cooled laboratory fluidized solid reactor. In each case the carrier gas was bubbled through the liquid $C_5$ feed to saturate the carrier gas giving $C_5$ partial pressures in the feed to the unit as indicated. The feed to the unit was continued until the temperature of the bed fell to the temperature of the cooled water, i.e., 17° C. (no more heat of reaction), the bed was then stripped with the amount of $N_2$ indicated at this temperature and then the temperature was elevated to 100° C. to effect decomplexing (product analyzed and volume measured). The pertinent conditions used and the results obtained are given below:

| Run No | 1 | 2 | 3 | 4 |
|---|---|---|---|---|
| Temperature, °C | 21 | 23 | 21 | 19 |
| Inlet pressure, atmos | 1.07 | 1.07 | 1.07 | 1.07 |
| Carrier gas | $N_2$ | 1-butene | 1-butene | $N_2$ |
| Carrier gas feed rate, l./min | 1.6 | 1.8 | 1.5 | 1.3 |
| HC feed bubbler, bath temp., °C | 17 | 17 | 17 | 17 |
| $C_5$ partial pressure in feed, atmos | 0.37 | 0.21 | 0.21 | 0.37 |
| Fluidized bed height, inches | 14.5 | 14 | 13 | 15 |
| Volume of $N_2$ for stripping, liters | 9.8 | 9.8 | 9.9 | 8.5 |
| Piperylene recovery, percent [1] | 21 | 23 | 16 | 12 |
| Saturation of CuCl, percent of theor | 43 | 57 | 63 | 40 |
| Hydrocarbon compositions, mol percent: [2] | | | | |
| Feed: | | | | |
| Cis-piperylene | 31.3 | 23.1 | 23.2 | 27.9 |
| Trans-piperylene | 59.4 | 65.6 | 66.5 | 64.3 |
| Cyclopentene | 9.3 | 10.2 | 10.3 | 7.7 |
| Tail gas: | | | | |
| Cis-piperylene | 22.1 | 24.2 | 22.8 | 24.7 |
| Trans-piperylene | 66.1 | 62.3 | 64.9 | 66.5 |
| Cyclopentene | 11.7 | 13.5 | 12.3 | 8.8 |
| Product: | | | | |
| Cis-piperylene | 13.2 | 15.6 | 15.4 | 13.6 |
| Trans-piperylene | 86.4 | 84.0 | 84.1 | 86.1 |
| Cyclopentene | 0.4 | 0.3 | 0.4 | 0.3 |

[1] Calculated from stream composition.
[2] Butene-free basis.

This example shows that approximately 50% improvement in capacity (saturation of CuCl, percent theoretical) is obtained without loss of activity (percent diolefin removal) or product purity (percent diolefin). It is noted that the activating effect of the butene is clearly seen in that with $N_2$ the concentration of $C_5$ hydrocarbon wetting the surface of the CuCl is approximately 100% while with butene-1 it is only 60–70% $C_5$. Thus, despite this lower concentration higher capacity is obtained with butene-1 than with $N_2$.

Example 3.—Methanol additive—butadiene

Active CuCl (prepared by precipitation of solid CuCl-butadiene complexed from a solution of CuCl dissolved in isobutylene and dissociating) was charged to a continuous fluid bed reactor operated utilizing feed containing 33 wt. percent butadiene, the remainder being mainly isobutylene and butene-1. The reactor was operated at a top temperature of 65° F.; top pressure of 3–5 p.s.i.g.; a superficial gas velocity of 0.25–0.3 ft./sec.; approach to dewpoint, 6–8° F.; bed height 6–8 ft. The decomplexer was operated at 178–180° F., a top pressure of 12 p.s.i.g., with butadiene fluidizing gas supplied at a superficial velocity of 0.25 ft./sec. The circulation rate was 0.5 lb./minute. At run hour 163, 0.05 volume percent methanol was injected and at run hour 177 a sample of CuCl removed from the line to the decomplexer was found to have a capacity of 37.5% of theoretical (butadiene). At run hour 189 after all the methanol additive had presumably been removed, the CuCl capacity was found to be only 26.5%. This example shows the beneficial effect of methanol as an additive.

i.e., 55–56 wt. percent ethylene in $C_2$. The height of the fluid bed was approximately 15 inches.

| | Run 1 | Run 2 | Run 3 | Run 4 | Run 5 | Run 6 | Run 7 | Run 8 |
|---|---|---|---|---|---|---|---|---|
| Nucleating agent | None | $C_4^=$ —1 at —30° C. | None | Isobutylene at —40° C. | None | $CH_3OH$ at —35° C. | None | 1,5-COD.[1] |
| Inlet pressure, atmos | 1.06 | 1.06 | 1.06 | 1.06 | 1.06 | 1.06 | 1.06 | 1.07. |
| Bed temperature, ° C | —28 | —23 | —29 | —27 | —28 | —27 | —28 | —28. |
| Feed gas rate, l./min. at 23° C. and 1 atmos. | 2.0 | 2.0 | 2.2 | 1.8 | 2.1 | 2.3 | 1.7 | 0.6. |
| Initial $C_2^=$ recovery, percent | 15 | 14 | 7 | 38 | 8 | 16 | 24 | 0. |
| Saturation of CuCl, percent of theor | 23 | 35 | 11 | 27 | 12 | 30 | 23 | 0. |
| Fluidization | | Slugging | Fair | Fair | Fair | Fair | Good | Good. |

[1] Total of 3–5 cc. absorbed into bed from $N_2$ stream before the run.

| | Run 9 | Run 10 | Run 11 | Run 12 | Run 13 | Run 14 | Run 15 |
|---|---|---|---|---|---|---|---|
| Nucleating agent | 1,5-COD [1] | 1,5-COD at 0° C.[2] | $H_2O$ at 0° C. | None | C.P. —4 at —40° C. | None | Isopentane at —32° C. |
| Inlet pressure, atmos | 1.06 | 1.08 | 1.08 | 1.07 | 1.07 | 1.09 | 1.09. |
| Bed temperature, ° C | —28 | —27 | —27 | —30 | —25 | —30 | —27. |
| Feed gas rate, l./min. at 23° C. and atmos. | 2.1 | 1.3 | 2.0 | 1.6 | 1.1 | 3.4 | 3.6. |
| Initial $C_2^=$ recovery, percent | 20 | 18 | 13 | 13 | 5 | 16 | 15. |
| Saturation of CuCl, percent of theor | 14 | 16 | 13 [3] | 17 | 9 [4] | 36 | 49. |
| Fluidization | Good | Good | Poor ratholing. | Very good | Very good | Some slugging. | Good. |

[1] May have very little COD left on CuCl.
[2] Feed stream bubbled through COD at 0° C. before entering reactor.
[3] This number is too low since mercury blew out of manometer during desorption and some $C_2^=$ escaped.
[4] An activity run on BR crude butadiene right after this run gave 78% recovery and 79% saturation of CuCl showing that sample was not deactivated.

| | Run 16 | Run 17 | Run 18 | Run 19 |
|---|---|---|---|---|
| Nucleating Agent | (¹) | None | (²) | (³) |
| Inlet Pressure, atmos | 1.09 | 1.09 | 1.09 | 1.11 |
| Bed Temperature, ° C | —27 | —28 | —26 | —24 |
| Feed Gas Rate, l./min. at 23° C. and 1 atmos. | (6.2) | 2.8 | 3.6 | 2.8 |
| Initial $C_2^=$ Recovery, percent | 25 | 5 | 24 | 17 |
| Saturation of CuCl, percent of Theor | 51 | 17 | 47 | 41 |
| Fluidization | (⁴) | Good | Good | (⁵) |

[1] Isopentene at —30° C.
[2] Isooctane at —32° C.
[3] Only the ethylbenzene left in the bed by after 27° C. decomplexing with this material.
[4] Some bridging.
[5] Some bogging.

Example 4.—Effect of inert additive in butadiene recovery

Runs similar to those described in Example 2 were made with isooctane as the additive under conditions and with results as shown below.

| Run No | 1 | 2 | 3 |
|---|---|---|---|
| Nucleating agent | None | Isooctane | None |
| Bubbler temp., ° C | | 16 | |
| Inlet pressure, atmos | 1.07 | 1.07 | 1.07 |
| Bed temperature, ° C | 12.5 | 26 | 26 |
| Feed gas rate, l./min. (23° C. and 1 atmos.) | 2.2 | 1.9 | 1.9 |
| Initial $C_4^=$ recovery, percent theor | 88 | 51 | 47 |
| Saturation of CuCl, percent theor | 71 | 64 | 57 |
| Fluidization | (¹) | (¹) | (¹) |
| Stream composition:[2] | | | |
| Percent butadiene in— | | | |
| Feed | 29.0 | 29.2 | 30.7 |
| Tail gas | 4.6 | 16.8 | 19.1 |
| Product | 97.9 | 99.2 | 98.9 |

[1] Very good.
[2] Remainder approximately equal amounts of butene-1 and isobutylene (isooctane additive excluded).

This example shows that by adding isooctane higher purity product is obtained (Runs 2 vs. Runs 1 and 3). Also, that good capacity (saturation of CuCl, percent of theoretical) can thus be obtained further from the dewpoint (Run 2 vs. Run 1) or higher capacity at the same distance from the dewpoint (Run 2 vs. Run 3).

Example 5.—Various additives with ethylene

Runs similar to those described in Example 4 were conducted this time with a dilute ethylene feed stream, i.e., 55–56 wt. percent ethylene in $C_2$. The height of the fluid bed was approximately 15 inches.

What is claimed is:
1. In a process for the separation of a compound capable of forming a complex with a solid cuprous halide from a feed mixture containing it in which the said mixture is contacted with solid cuprous halide particles in the vapor phase under conditions to form a complex between said compound and said particles and the complexed particles are subsequently dissociated to recover said compound the improvement which comprises adding to the feed mixture a vaporous extraneous material boiling above the feed mixture selected from the group consisting of monoolefin solvents for cuprous halides, alcohols, water and C1–C10 paraffins, whereby the concentration of said compound on the surface of the solid cuprous halide is increased.

2. The process of claim 1 in which the complexing contacting is conducted under conditions such that the feed mixture is within 15° C. of its dewpoint.

3. The process of claim 1 in which the extraneous material boils above the temperature employed in the dissociation of the complexed cuprous halide.

4. The process of claim 1 in which the extraneous material has a substantially different boiling point than the feed mixture.

5. The process of claim 1 in which the complexing contacting is conducted under conditions such that the feed mixture is within 15° C. of its dewpoint.

6. The process of claim 5 in which the cuprous halide is cuprous chloride and the extraneous active material is a monoolefin having high solubility for cuprous chloride.

7. In a process for the separation of a compound capable of forming a complex with a solid cuprous halide from a feed mixture containing it in which the said mixture is contacted in the liquid phase with solid cuprous halide particles under conditions to form a complex between said compound and said solid cuprous halide and the complexed cuprous halide is subsequently dissociated to recover said compound the improvement which comprises adding to the feed mixture an extraneous monoolefin solvent for cuprous halides having a higher boiling point than the feed mixture.

8. The process of claim 7 in which the monoolefin solvent has a substantially different boiling point than the feed mixture.

9. The process of claim 7 in which the cuprous halide is cuprous chloride and the monoolefin solvent is a monoolefin having high solubility for cuprous chloride.

10. The process of claim 5 wherein the cuprous halide is cuprous chloride and the extraneous material is water.

11. The process of claim 5 wherein the cuprous halide is cuprous chloride and the extraneous material is an alcohol.

12. The process of claim 5 wherein the cuprous halide is cuprous chloride and the extraneous material is a $C_1$–$C_{10}$ paraffin.

References Cited

UNITED STATES PATENTS

| 2,209,452 | 7/1940 | Gilliland | 260—677 |
| 2,386,274 | 10/1945 | Shot et al. | 260—680 |

OTHER REFERENCES

Manchot and Brandt: "Copper-Olefin Compound," Chemical Review 28, 1941, p. 237.

DELBERT E. GANTZ, *Primary Examiner.*

J. D. MYERS, *Assistant Examiner.*